(12) United States Patent
Chander et al.

(10) Patent No.: US 10,343,500 B2
(45) Date of Patent: Jul. 9, 2019

(54) VEHICLE WINDOW ASSEMBLY WITH POLARIZED WINDOWPANES AND METHOD OF OPERATING SAME

(71) Applicant: Ford Global Technologies, LLC, Dearborn, MI (US)

(72) Inventors: Bala Chander, Canton, MI (US); Rick H. Wykoff, II, Commerce Township, MI (US); Kenneth Edward Nietering, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 15/468,764

(22) Filed: Mar. 24, 2017

(65) Prior Publication Data

US 2018/0272843 A1    Sep. 27, 2018

(51) Int. Cl.
| | |
|---|---|
| *B60J 3/06* | (2006.01) |
| *E05F 15/689* | (2015.01) |
| *B32B 17/06* | (2006.01) |
| *B60J 1/17* | (2006.01) |
| *E05F 15/70* | (2015.01) |

(52) U.S. Cl.
CPC .............. *B60J 3/06* (2013.01); *B32B 17/06* (2013.01); *B60J 1/17* (2013.01); *E05F 15/689* (2015.01); *E05F 15/70* (2015.01); *E05Y 2800/106* (2013.01); *E05Y 2800/21* (2013.01); *E05Y 2800/40* (2013.01); *E05Y 2900/55* (2013.01)

(58) Field of Classification Search
CPC ...... B60J 3/06; B60J 3/04; B60J 1/001; E06B 9/24; E06B 2009/2405; E05F 15/70; E05F 15/689
See application file for complete search history.

(56) References Cited

U.S. PATENT DOCUMENTS 4,331,359 A  *  5/1982  Sheldon ..................... B60J 1/17
                                              296/146.2
4,773,697 A  *  9/1988  Svensson .................. B60J 3/02
                                                  160/37

(Continued)

FOREIGN PATENT DOCUMENTS

| CN | 2127115 | 2/1993 |
|---|---|---|
| CN | 202071751 | 12/2011 |

(Continued)

OTHER PUBLICATIONS

U.S. Appl. No. 15/411,200, filed Jan. 20, 2017.

(Continued)

*Primary Examiner* — Justin B Rephann
(74) *Attorney, Agent, or Firm* — Carlson, Gaskey & Olds, P.C.

(57) ABSTRACT

A window assembly includes a first polarizing windowpane, and a second polarizing windowpane. The first and second polarizing windowpanes are each independently moveable between a first position that blocks an opening to an interior of a vehicle, and a second position that does not block the opening. A window operating method includes moving first and second polarizing windowpanes of a window assembly from respective first positions that block an opening to an interior of a vehicle to respective second positions that do not block the opening.

18 Claims, 4 Drawing Sheets

(56) References Cited

U.S. PATENT DOCUMENTS

| | | | | |
|---|---|---|---|---|
| 4,832,468 | A | | 5/1989 | Ito et al. |
| 4,930,255 | A | * | 6/1990 | Sea .................. B60J 1/17 49/349 |
| 5,033,829 | A | * | 7/1991 | Faroughy ............. E06B 9/24 359/486.03 |
| 5,164,856 | A | * | 11/1992 | Zhang ................ E06B 9/24 359/486.02 |
| 5,165,188 | A | * | 11/1992 | Tsiros ................ B60J 3/02 296/146.2 |
| 5,189,552 | A | * | 2/1993 | Metwalli .............. B60J 3/06 359/486.03 |
| 5,249,078 | A | * | 9/1993 | Bentley .............. G02B 27/281 296/97.6 |
| 5,345,719 | A | * | 9/1994 | Karwande ............ B60J 1/001 49/495.1 |
| 5,405,184 | A | * | 4/1995 | Jardin ................ B60J 7/003 296/211 |
| 5,878,425 | A | | 3/1999 | Redpath |
| 5,955,854 | A | * | 9/1999 | Zhang ................ B60J 7/0573 318/264 |
| 6,467,935 | B1 | * | 10/2002 | Schwab ............... E06B 9/24 359/275 |
| 6,523,880 | B1 | * | 2/2003 | Yako ................. B60J 1/2011 296/152 |
| 6,561,568 | B1 | * | 5/2003 | Gray ................. B60J 1/2094 296/146.2 |
| 6,840,562 | B2 | * | 1/2005 | Schlecht .............. B60J 1/2019 160/265 |
| 7,681,369 | B2 | | 5/2010 | Soltesiz et al. |
| 7,806,461 | B2 | * | 10/2010 | Patterson ............ B60J 7/003 296/146.2 |
| 8,382,200 | B2 | | 2/2013 | Mathes et al. |
| 2003/0025354 | A1 | * | 2/2003 | Akintan ............... B60J 1/17 296/146.16 |
| 2005/0231336 | A1 | * | 10/2005 | Strohband ......... B32B 17/10532 340/426.27 |
| 2006/0098290 | A1 | * | 5/2006 | Fernando ......... B32B 17/10036 359/609 |
| 2007/0097503 | A1 | * | 5/2007 | Tsuji ................ B60J 3/0204 359/488.01 |
| 2008/0144159 | A1 | * | 6/2008 | Nerden ............... G02B 26/02 359/227 |
| 2008/0231934 | A1 | * | 9/2008 | Knafou ............... B60J 3/04 359/245 |
| 2009/0015740 | A1 | * | 1/2009 | Sagitov .............. B60J 3/04 349/16 |
| 2010/0315693 | A1 | * | 12/2010 | Lam .................. G02B 5/23 359/241 |
| 2014/0375083 | A1 | * | 12/2014 | Tejeda ............... B60J 7/043 296/187.11 |
| 2016/0082812 | A1 | * | 3/2016 | Okuda ............... B60J 3/04 49/323 |
| 2016/0083997 | A1 | | 3/2016 | Seamon |
| 2016/0104437 | A1 | * | 4/2016 | Iwakawa ............. G02B 6/0011 345/690 |
| 2016/0318379 | A1 | * | 11/2016 | Okuda ............... B60J 3/04 |
| 2017/0136854 | A1 | * | 5/2017 | Dunne ............... B60J 1/2011 |
| 2017/0268279 | A1 | * | 9/2017 | Campagnolo ........... B60J 3/04 |

FOREIGN PATENT DOCUMENTS

| | | |
|---|---|---|
| EP | 1780062 | 5/2007 |
| KR | 20080020009 | 3/2008 |
| WO | 2011042135 | 4/2011 |

OTHER PUBLICATIONS

Aaron, John, Md. driver devises a $5 solution for 'wind throb', WTOP, Washington's Top News, Aug. 15, 2016, retrieved from http://wtop.com/montgomery-county/2016/08/north-bethesda-porsche-owner-devises-solution-wind-throb/ on Mar. 17, 2017.

* cited by examiner

VEHICLE WINDOW ASSEMBLY WITH POLARIZED WINDOWPANES AND METHOD OF OPERATING SAME

TECHNICAL FIELD

This disclosure relates generally to a vehicle window and, more particularly, to a vehicle window with moveable windowpanes that have different polarizations.

BACKGROUND

Vehicles typically include windows. Each window has a windowpane that can move up and down between a fully open position and a fully closed position, and to positions between the fully open and fully closed position. In the fully closed position, the windowpane blocks an opening to a passenger compartment of the vehicle. In the fully open position, the windowpanes do not block the opening.

Sometimes, the windowpane can be tinted so that the window provides privacy by varying the visible light transmission level of the window, which slows the rate at which solar energy irradiating the vehicle heats the passenger compartment.

SUMMARY

A window assembly according to an exemplary aspect of the present disclosure includes, among other things, a first polarizing windowpane, and a second polarizing windowpane. The first and second polarizing windowpanes are each independently moveable between a first position that blocks an opening to an interior of a vehicle, and a second position that does not block the opening.

In a further, non-limiting embodiment of the foregoing window assembly, a polarizing axis of the first polarizing windowpane is transverse to a polarizing axis of the second polarizing windowpane.

In a further, non-limiting embodiment of any of foregoing window assemblies, the polarizing axis of the first polarizing windowpane is 90 degrees offset from the polarizing axis of the second polarizing windowpane.

In a further, non-limiting embodiment of any of foregoing window assemblies, one of the first or second polarizing windowpanes is polycarbonate and the other of the first or second polarizing windowpanes is glass.

In a further, non-limiting embodiment of any of foregoing window assemblies, the first and second polarizing windowpanes are portions of a side window of the vehicle.

In a further, non-limiting embodiment of any of foregoing window assemblies, the first and second polarizing windowpanes each comprise a polarizing film layer and a glass or polycarbonate layer.

In a further, non-limiting embodiment of any of foregoing window assemblies, the first polarizing windowpane is spaced a distance from the second polarizing windowpane such that there is a gap between the first and second polarizing windowpanes when the first and second polarizing windowpanes are in the first positions.

In a further, non-limiting embodiment of any of foregoing window assemblies, the first polarizing windowpane is an interior windowpane having a polarizing axis oriented horizontally, and the second polarizing windowpane is an exterior windowpane having a polarizing axis oriented vertically.

In a further, non-limiting embodiment of any of foregoing window assemblies, the first positions are fully closed positions.

A window operating method according to another exemplary aspect of the present disclosure includes, among other things, moving first and second polarizing windowpanes of a window assembly from respective first positions that block an opening to an interior of a vehicle to respective second positions that do not block the opening.

In a further non-limiting embodiment of the foregoing method, a polarizing axis of the first polarizing windowpane is transverse to a polarizing axis of the second polarizing windowpane.

In a further, non-limiting embodiment of any of foregoing methods, the polarizing axis of the first polarizing windowpane is 90 degrees offset from the polarizing axis of the second polarizing windowpane.

In a further, non-limiting embodiment of any of foregoing methods, the first and second polarizing windowpanes overlap each other when in the first positions.

In a further, non-limiting embodiment of any of foregoing methods, the first and second polarizing windowpanes are moveable relative to each other.

In a further, non-limiting embodiment of any of foregoing methods, the first and second polarizing windowpanes are portions of a side window of the vehicle.

In a further, non-limiting embodiment of any of foregoing methods, the first polarizing windowpane is spaced a distance from the second polarizing windowpane such that there is a gap between the first and second polarizing windowpanes when the first and second polarizing windowpanes are in the first positions.

In a further, non-limiting embodiment of any of foregoing methods, the first polarizing windowpane is an interior windowpane having a polarizing axis oriented horizontally, and the second polarizing windowpane is an exterior windowpane having a polarizing axis oriented vertically.

In a further, non-limiting embodiment of any of foregoing methods, the first positions are fully closed positions.

In a further, non-limiting embodiment of any of foregoing methods, the first polarizing windowpane is an interior windowpane, and the second polarizing windowpane is an exterior windowpane. The method includes moving the second polarizing windowpane to the second position to influence aerodynamics as air moves over the vehicle.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
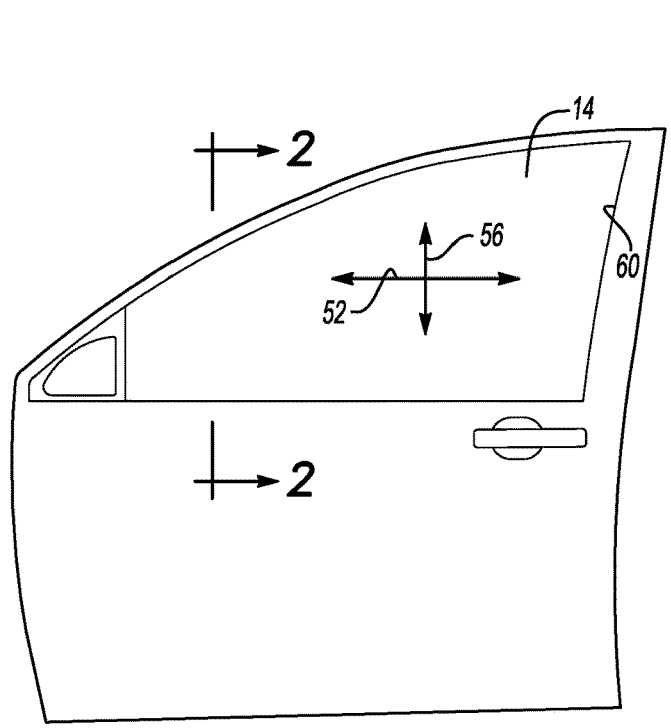
FIG. 1 illustrates a window assembly having two windowpanes that are both in a fully closed position.
Figure 3:
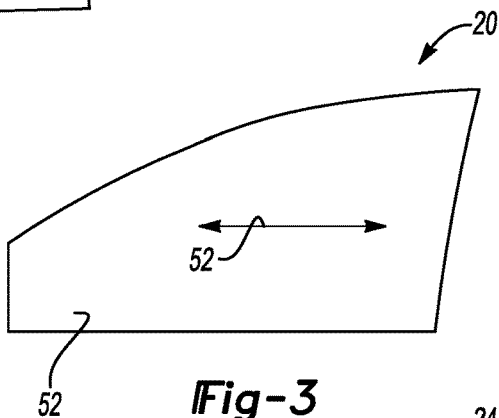
FIG. 3 illustrates a side view of a first windowpane from the window assembly of FIG. 1.
Figure 4:
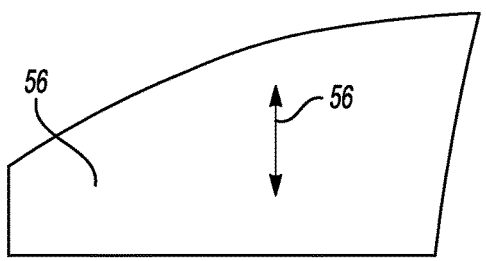
FIG. 4 illustrates a side view of a second windowpane from the window assembly of FIG. 1.
Figure 2:
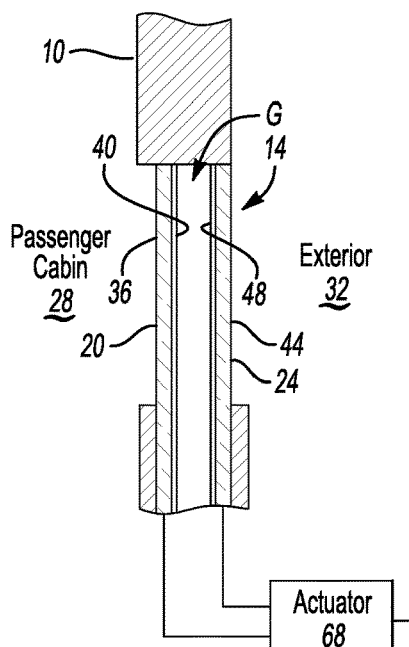
FIG. 2 illustrates a section view taken at Line 2-2 in FIG. 1.

This disclosure relates to a window assembly for a vehicle. The window assembly includes windowpanes having different polarizations. By varying the position of the windowpanes relative to each other, different combinations of polarization can be achieved thus changing the visible transmission level of the windowpanes.

Referring now to FIGS. 1 to 4, a driver side front door 10 of a vehicle includes a window assembly 14. In another non-limiting embodiment, the window assembly 14 could be incorporated into another door, such as a rear door, or another area of the vehicle, such as a roof. In still other examples, the window assembly 14 could be incorporated into a building, such as a home or an office building.

The exemplary window assembly 14 includes a first windowpane 20 spaced a distance from a second windowpane 24 such that there is a gap G between the first windowpane 20 and the second windowpane 24. In some examples, the gap G can enhance the insulating properties of the window assembly 14.

In this example, the first windowpane 20 is an interior windowpane, and the second windowpane 24 is an exterior windowpane. That is, the first windowpane 20 is closer to a passenger compartment 28 than the second windowpane 24, and the second windowpane 24 is closer to an exterior 32 of the vehicle than the first windowpane 20.

The first windowpane 20 includes a layer 36 that is glass and a polarizing film layer 40. In another example, the layer 36 is a polycarbonate, acrylic, or another type of optically clear or tinted material. The second windowpane 24 includes a layer 44 that is glass and a polarizing film layer 48. In another example, the layer 44 is a polycarbonate, acrylic, or another type of optically clear or tinted material.

In some examples, the layer 36 is polycarbonate and the layer 44 is glass, or vice versa. In such examples, breaking the glass, but not the polycarbonate, could trigger a security alarm. The thickness of the polycarbonate could be designed to meet rescue requirements, while maintaining strength to prevent inadvertent breakage.

In some examples, a sensor, such as an inertia sensor, on the vehicle detects an impact event, and a controller of the vehicle then triggers a rescue mode where the windowpane that is polycarbonate fully opens allowing first responders to access the passenger compartment.

The polarizing film layers 40 and 48 can be secured to the respective layers 36 and 44 utilizing an adhesive, for example. Due to the respective polarizing film layers 40 and 48, the first and second windowpanes 20 and 24 can be considered polarizing windowpanes.

The polarizing film layer 40 of the first windowpane 20 and the polarizing film layer 48 of the second windowpane 24 face toward the gap G. The layers 36 and 44 thus protect the polarizing film layers 40, 48. An abrasion resistant coating, a chemically resistant coating, or both could be applied to the polarizing film layers 40, 48 to provide additional protection.

In some examples, the polarizing film layers 40, 48 are each additionally sandwiched between a layer of glass or polycarbonate and the respective layers 36, 44. The layer of thin glass or polycarbonate provides additional protection.

The windowpanes 20, 24 could incorporate other layers, such as an infrared coating. For example, a side of the windowpane 24, which is the exterior windowpane, could include an infrared reflective coating. The infrared reflecting layer would be sandwiched between the polarizing film layer 48 and the layer of glass 44, for example. The infrared reflective coating can facilitate rejection of solar infrared energy into the passenger cabin 28 through the opening 60 when the windowpane 24 is partially or fully covering the opening 60.

Although the example window assembly 14 includes the gap G between the first windowpane 20 and the second windowpane 24, other example window assemblies could include windowpanes that directly contact and rub against one another when moving relative to each other.

The polarizing film layer 40, in this example, is a filter having a polymer orientation that provides a polarization axis 52 arranged in a first direction. In this exemplary embodiment, the polarizing film layer 40 of the first windowpane 20 is arranged such that the polarization axis 52 is substantially horizontally aligned or horizontal.

The polarizing film layer 48, in this example, is a filter having a polymer orientation that provides a polarization axis 56 in a second direction that is transverse to the first direction. In this exemplary embodiment, the polarizing film layer 48 of the second windowpane 24 is arranged such that the polarization axis is substantially vertically aligned or vertical.

The polarization axis 52 of the first windowpane 20 is thus offset 90 degrees from the polarization axis 56 of the second windowpane 24 in this exemplary embodiment. In other examples, the offset between the polarization axis 52 of the first windowpane 20 and the polarization axis 56 of the second windowpane 24 could be something other than 90 degrees. Further, the filtering could be switched such that the first windowpane 20 has a vertical polarizing axis and the second windowpane 24 is a horizontal polarizing axis.

The polarization axes 52 and 56 can block visible light. For example, because light oscillates when traveling, the polarizing film layer 40 can block at least some light oscillations substantially perpendicular to the orientation of the polarization axis 52, while permitting light oscillations parallel to the orientation of the polarization axis 52 to pass through the first windowpane 20.

The first windowpane 20 and second windowpane 24 can be operated independently from each other to influence passage of visible light through the opening 60.

When the first windowpane 20 and the second windowpane 24 are in the position of FIG. 1, the first windowpane 20 and the second windowpane 24 are both in a fully closed position. When the first windowpane 20, the second windowpane 24, or both are in the fully closed position, the opening 60 through the door 10 between the passenger compartment 28 and the exterior 32 is blocked and the first windowpane 20 overlaps the second windowpane 24.

The light filtering provided by the window assembly 14 is maximized when the first windowpane 20 and the second windowpane 24 are fully closed. The first windowpane 20 and the second windowpane 24 can be fully closed in response to a privacy setting. For example, a controller 64 of the vehicle may automatically command an actuator 68 to move the first windowpane 20 and the second windowpane 24 to the fully closed position when the vehicle is parked.

Alternatively, an operator of the vehicle could command the first windowpane 20 and the second windowpane 24 to move to the fully closed position. The first windowpane 20 and the second windowpane 24 could be commanded together or commanded individually to move to the fully closed positions. Further, all the windowpanes on all the windows of the vehicle could operate together in response to a command from a single window control switch, or could operate individually in response to commands from multiple window control switches.

Typically, the actuator 68 is hidden within the door 10 and actuates the first windowpane 20, the second windowpane 24, or both in response to a command from the controller 64. The actuator 68 could be a single actuator suitable for actuating the first windowpane 20 and the second windowpane 24 both separately and together. The actuator 68 could be a collection of two or more individual actuators.

In this example, the first windowpane 20 and the second windowpane 24, when fully closed, can reduce the solar energy entering the passenger compartment and heating of the passenger compartment 28 when the vehicle is, for example, parked in a hot environment. The first windowpane 20 and the second windowpane 24, when fully closed, can block light from passing through the window assembly 14, which effectively darkens the window assembly 14.

Darkening the window assembly 14 can provide a security benefit as a person outside the passenger compartment 28 is not able to clearly view the passenger compartment 28 through the window assembly 14. Further, the vehicle may be better protected since both the first windowpane 20 and the second windowpane 24 must be broken in order to pass through the opening 60. In some examples, a controller of the vehicle automatically moves the first windowpane 20 and the second windowpane 24 to the fully closed position when a drive cycle ends, or when the vehicle is locked.

Figure 5:
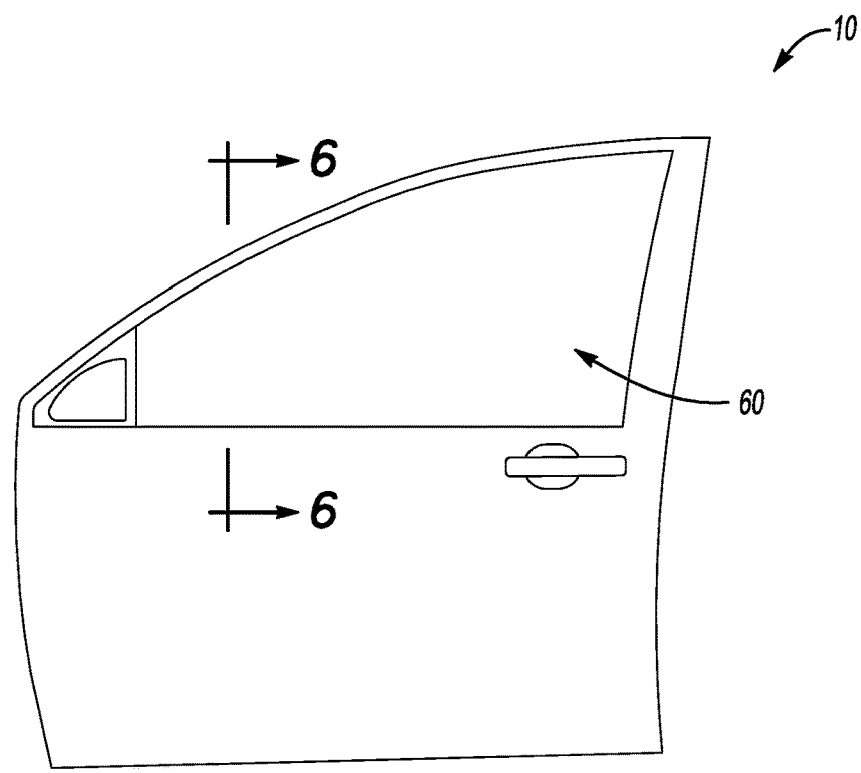
FIG. 5 illustrates the window assembly of FIG. 1 when the windowpanes are both in a fully open position.
Figure 6:
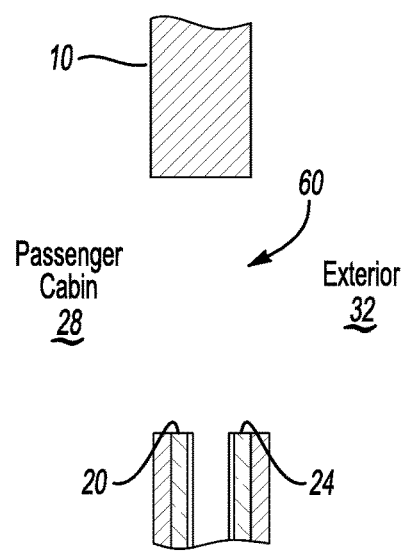
FIG. 6 illustrates a section taken at Line 6-6 in FIG. 5.

The first windowpane 20 and the second windowpane 24 can both move from the fully closed position of FIG. 1 to the fully open position shown in FIGS. 5 and 6. The movement can be in response to, for example, an operator command interpreted by the controller 64.

When the first windowpane 20 and the second windowpane 24 are both fully open, an opening 60 is provided within the door 10. Air is free to move through the opening 60 into the passenger compartment 28 from outside the vehicle when the first windowpane 20 and the second windowpane 24 are in the position of FIGS. 5 and 6.

Figure 7:
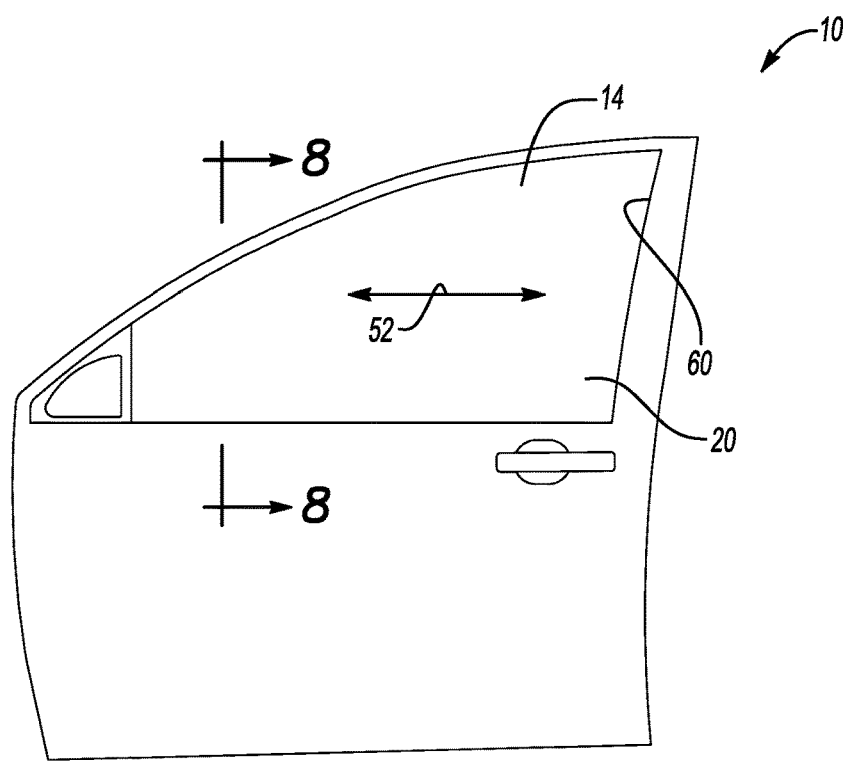
FIG. 7 illustrates the window assembly of FIG. 1 when the first windowpane is in the fully closed position and the second windowpane is in the fully open position.
Figure 8:
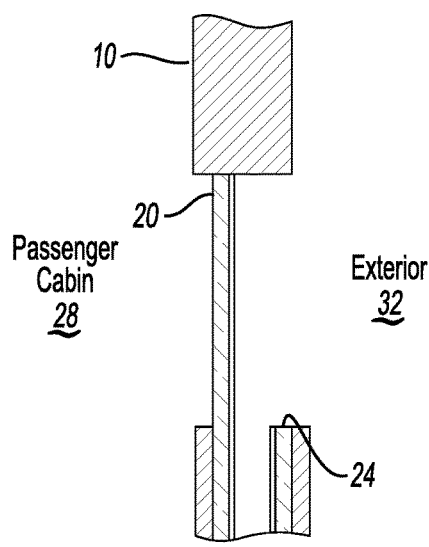
FIG. 8 illustrates a section taken at Line 8-8 in FIG. 7.

Referring now to FIGS. 7 and 8, another possible positioning of the window assembly 14 can include the first windowpane 20 in the fully closed position, and the second windowpane 24 in the fully open position. With this positioning, only the first windowpane 20 is influencing passage of visible light through the opening 60.

An operator may wish to position the window assembly 14 in the position of FIGS. 7 and 8 to influence aerodynamics as air moves over the vehicle as the vehicle is driven. Positioning the second windowpane 24 in the fully open position can, in some examples, inhibit Helmholtz resonance to address buffeting noise vibration and harshness issues (i.e., wind throb) associated with the window assembly 14 being substantially flush with an outwardly facing surface of the door 10 when the second windowpane 24 is fully closed.

Figure 9:
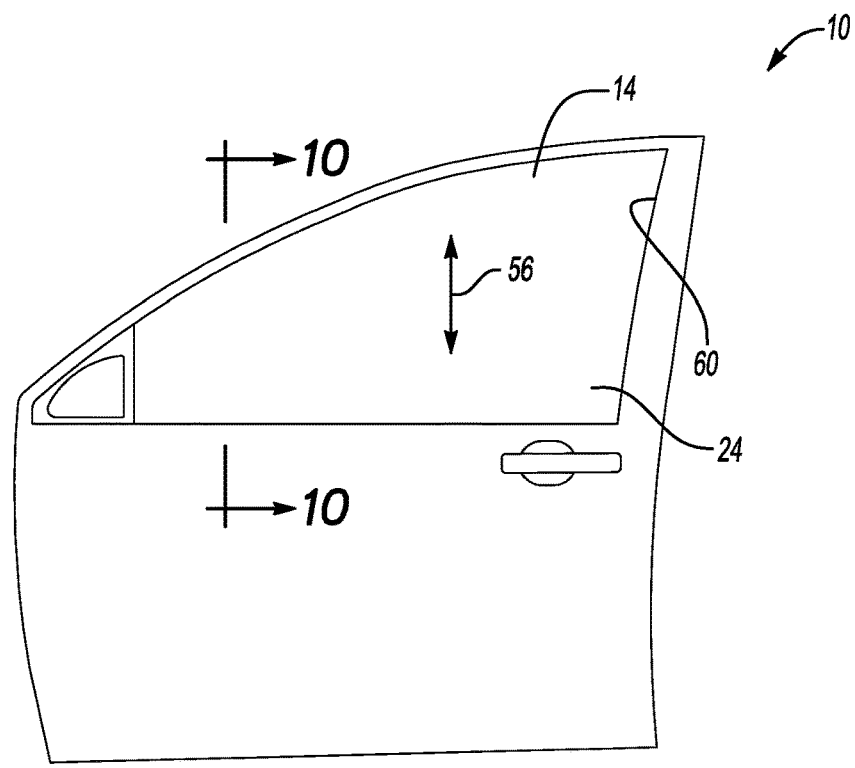
FIG. 9 illustrates the window assembly of FIG. 1 when the first windowpane is in the fully open position and the second windowpane is in the fully closed position.
Figure 10:
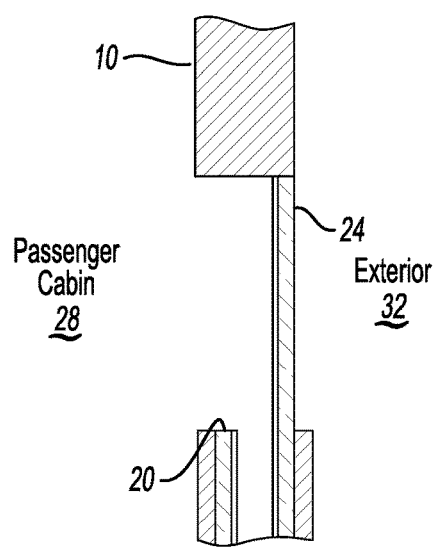
FIG. 10 illustrates a section taken at Line 10-10 in FIG. 9.

Referring now to FIGS. 9 and 10, another possible positioning of the window assembly 14 can include the first windowpane 20 in the fully open position and the second windowpane 24 in the fully closed position. With this positioning, only the second windowpane 24 is influencing passage of visible light through the opening 60.

An operator may desire to position the window assembly 14 in the position of FIGS. 9 and 10 to provide an occupant with a scenic setting where some glare is removed due to the polarization of the second windowpane 24, but the view through the window assembly 14 is not substantially obstructed.

Further, positioning the window assembly 14 in the position of FIGS. 9 and 10, with the second windowpane 24 fully closed, can block rain, sleet, snow, etc. from entering through the opening 60 into the door 10.

Other examples can include positioning the first windowpane 20, the second windowpane 24, or both at a position between the fully open and fully closed position.

Actuations of the first windowpane 20 and the second windowpane 24 can occur in response to a driver or another occupant within the passenger compartment operating window control switches to actuate the first windowpane 20 and the second windowpane 24 between the various positions described above. Separate switches may be devoted to control of the first windowpane 20 and the second windowpane 24.

Features of some of the examples disclosed above include a window assembly for a vehicle that can provide and maintain a privacy mode without requiring power. The window assembly can absorb and reradiate solar energy away from the passenger compartment when the vehicle is parked so less power is required to cool the passenger compartment to a desired temperature at the start of a drive cycle. The window assembly can insulate the passenger compartment when the vehicle is parked so that less power is required to heat the passenger compartment to a desired temperature at the start of a drive cycle. Additionally, lowering the outer windowpane of the window assembly can reduce noise, vibration, and harshness issues, such as buffeting, and the multiple windowpanes, when closed, can reduce road noise experienced by occupants of the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A window assembly, comprising:
a first polarizing windowpane; and
a second polarizing windowpane, the first and second polarizing windowpanes each independently moveable between a first position that blocks an opening to an interior of a vehicle, and a second position that does not block the opening, wherein, when the first and second polarizing windowpanes are both in the second position, air is free to move through the opening from outside the vehicle to an interior of the vehicle, and wherein a polarizing axis of the first polarizing windowpane is transverse to a polarizing axis of the second polarizing windowpane.

2. The window assembly of claim 1, wherein the first and second polarizing windowpanes each include no more than one polarizing axis.

3. The window assembly of claim 2, wherein the polarizing axis of the first polarizing windowpane is 90 degrees offset from the polarizing axis of the second polarizing windowpane.

4. The window assembly of claim 1, wherein the first and second polarizing windowpanes are portions of a side window of the vehicle, the side window disposed on a horizontally facing side of the vehicle.

5. The window assembly of claim 1, wherein first and second polarizing windowpanes each comprise a polarizing film layer and a glass or polycarbonate layer.

6. The window assembly of claim 1, wherein the first polarizing windowpane is spaced a distance from the second polarizing windowpane such that there is a gap between the first and second polarizing windowpanes when the first and second polarizing windowpanes are in the first positions.

7. The window assembly of claim 1, wherein the first polarizing windowpane is an interior windowpane having a polarizing axis oriented horizontally, and the second polarizing windowpane is an exterior windowpane having a polarizing axis oriented vertically.

8. The window assembly of claim 1, wherein the first positions are fully closed positions.

9. The window assembly of claim 1, further comprising a side door of the vehicle, the first and second polarizing windowpanes held within the side door.

10. A window operating method, comprising: moving first and second polarizing windowpanes of a window assembly from respective first positions that block an opening to an interior of a vehicle to respective second positions that do not block the opening, wherein, when the first and second polarizing windowpanes are both in the second position, air is free to move through the opening from outside the vehicle to an interior of the vehicle, wherein a polarizing axis of the first polarizing windowpane is transverse to a polarizing axis of the second polarizing windowpane, and wherein the first and second polarizing windowpanes are independently moveable relative to each other.

11. The window operating method of claim 10, wherein the polarizing axis of the first polarizing windowpane is 90 degrees offset from the polarizing axis of the second polarizing windowpane.

12. The window operating method of claim 10, wherein the first and second polarizing windowpanes overlap each other when in the first positions.

13. The window operating method of claim 10, wherein the first and second polarizing windowpanes are portions of a side window of the vehicle, the side window held within a side door of the vehicle.

14. The window operating method of claim 10, wherein the first polarizing windowpane is spaced a distance from the second polarizing windowpane such that there is a gap between the first and second polarizing windowpanes when the first and second polarizing windowpanes are in the first positions.

15. The window operating method of claim 10, wherein the first polarizing windowpane is an interior windowpane having a polarizing axis oriented horizontally, and the second polarizing windowpane is an exterior windowpane having a polarizing axis oriented vertically.

16. The window operating method of claim 10, wherein the first positions are fully closed positions.

17. The window operating method of claim 10, wherein the first polarizing windowpane is an interior windowpane, and the second polarizing windowpane is an exterior windowpane, and further comprising inhibiting Helmholtz resonance by moving the second polarizing windowpane toward the second position.

18. The window operating method of claim 10, wherein the first and second polarizing windowpanes each include no more than one polarizing axis.

* * * * *